UNITED STATES PATENT OFFICE.

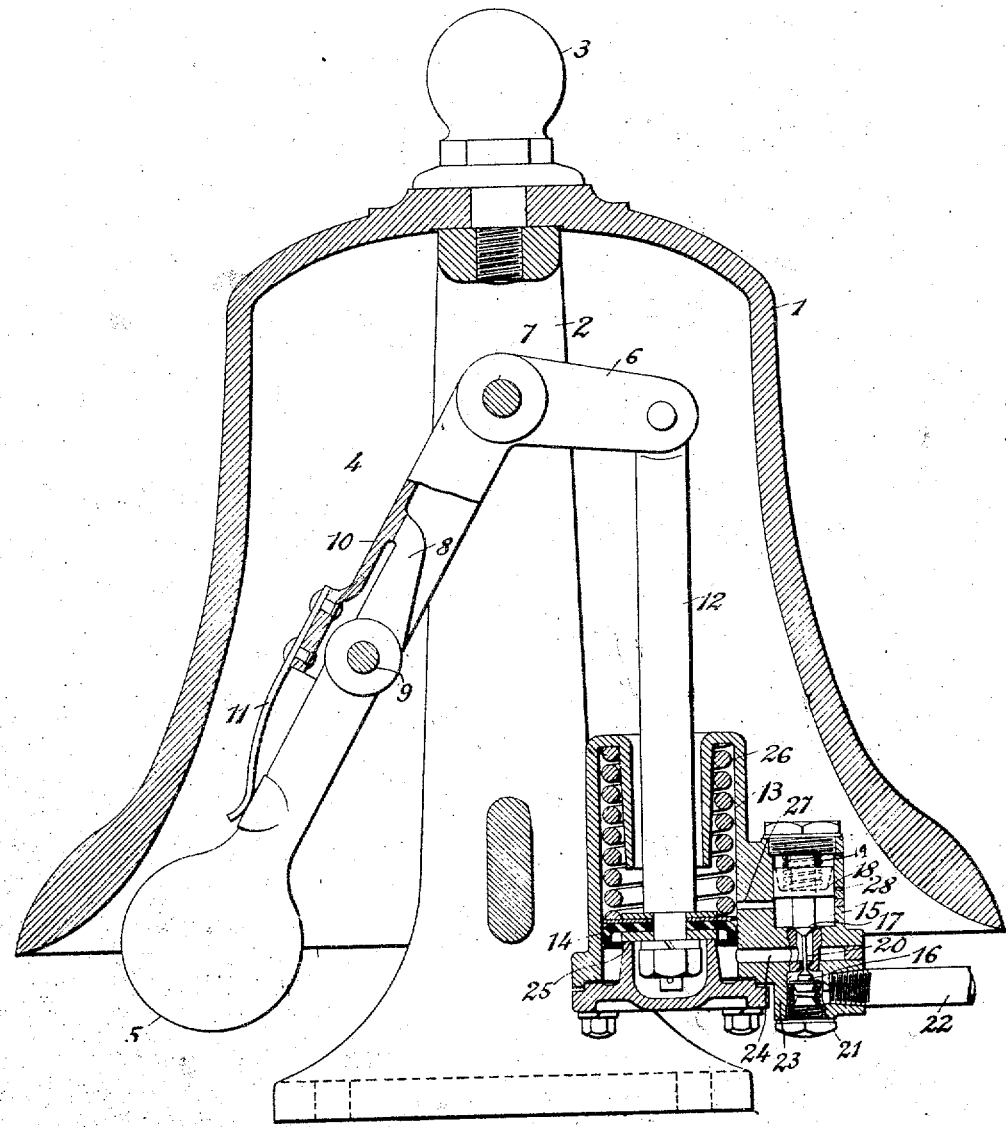

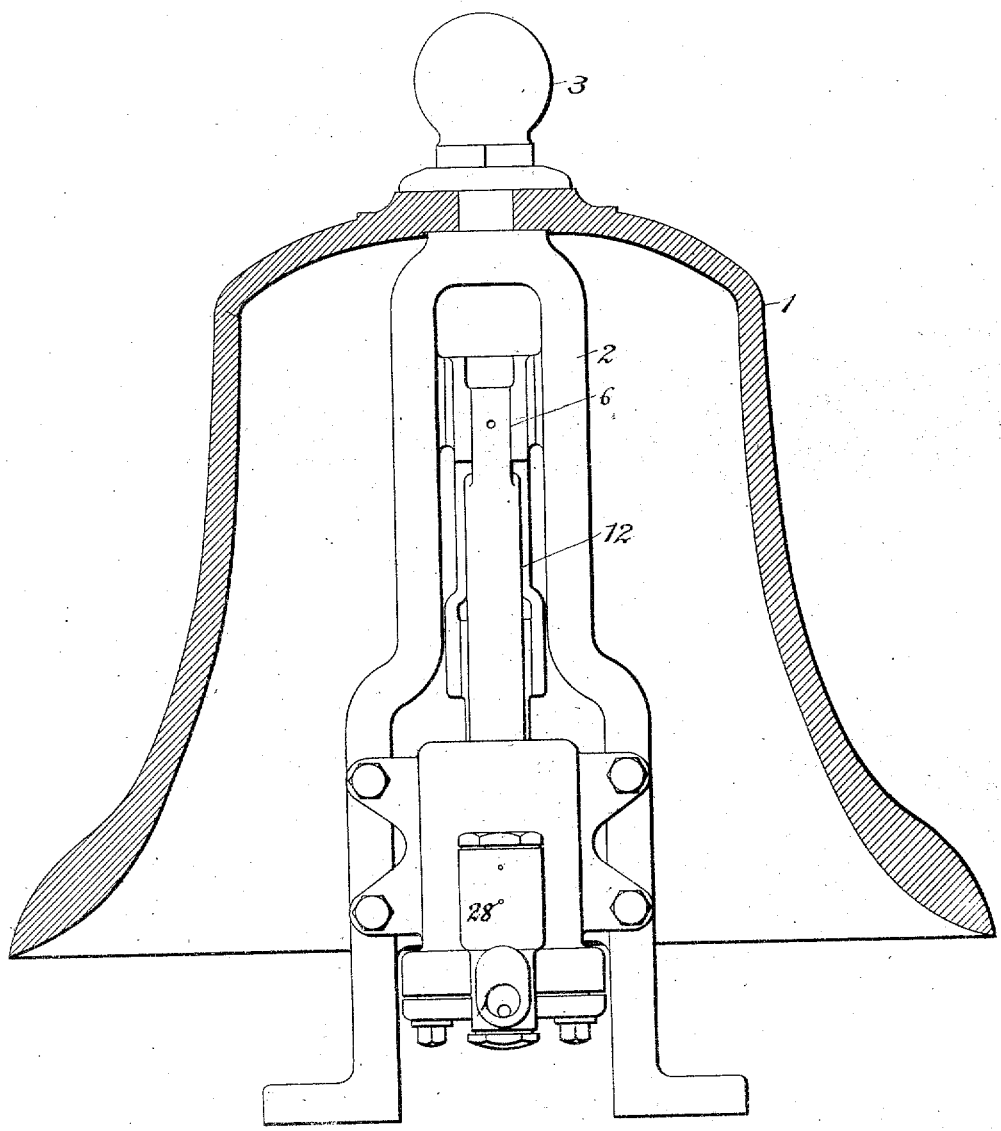

CHRISTIAN AALBORG, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC BELL-RINGER.

962,688.  Specification of Letters Patent.  Patented June 28, 1910.

Application filed April 4, 1906. Serial No. 309,930.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Automatic Bell-Ringers, of which the following is a specification.

My invention relates to automatic bell ringers and it has for its object to provide a device of this character which shall be operated by the application of a constant fluid-pressure and that shall move a suitable striker into and out of engagement with the bell proper so as to produce clear, sharp tones therefrom.

For use with electric locomotives or other devices which are controlled by one man it is sometimes desirable to provide a bell for warning purposes similar to those which are employed with ordinary steam-driven locomotives and in such cases it is of special advantage to toll the bell automatically in order that the attention of the locomotive driver may be directed entirely to the governing of the vehicle.

According to my present invention, I provide a device which is energized by a constant fluid-pressure and which continues to toll the bell as long as pressure is supplied to it. In this way, the function of the bell is maintained with a minimum attention from the engine driver.

Figure 1 of the accompanying drawings is a sectional elevation of a bell equipped with the automatic ringing device of my invention and Fig. 2 is a sectional elevation at right angles to the plane of Fig. 1, parts being broken away.

Referring to the drawings, a bell 1 is supported upon a stationary forked member 2 to which it is attached by a crown bolt 3, and is provided with a striker 4, comprising a tongue member 5 and a bell crank 6. The bell crank 6 is fulcrumed upon a shaft 7 and is hinge-connected to the tongue member 5, which is provided with a projection 8 that limits the movement of rotation of the tongue member about a hinge pin 9 in one direction by engagement with the web 10 of the bell crank 6. The tongue member 5 is normally held substantially in alinement with the arm to which it is attached by means of a spring 11 which is fixed to the bell crank 6 and engages the tongue member near its outer extremity. The other arm of the bell crank 6 is pivotally connected to one end of a piston rod 12 which is driven backward and forward to effect the tolling of the bell.

According to my invention, the rod 12 is reciprocated by a pneumatic mechanism which comprises a main cylinder 13, a piston 14 which operates therein and is connected to one extremity of the piston rod 12, a smaller auxiliary cylinder 15 and controlling valves 16 and 17. The valve 17 is directly connected to a piston 18 which operates within the auxiliary cylinder 15 and is normally held closed by means of a spring 19.

The valves 16 and 17 are connected by a rod 20 which is of sufficient length to hold the valve 16 open when the valve 17 is closed. The motion of the valve 17, however, is not restricted by the rod 20 and when the valve 17 is open, the valve 16 is normally held closed by a spring 21 which acts in opposition to the spring 19 and is not strong enough to close the valve 16 when the valve 17 is closed.

Fluid-pressure is applied to the device through a supply pipe 22 and first enters a chamber 23 from which it is admitted through a port 24 to the cylinder 13 at a point below the piston 14 when the valve 16 is open. The piston 14 is normally held at one extremity of its travel against the stop 25 by a relatively strong spring 26. The fluid-pressure applied to the piston 14 compresses the spring 26 and moves the piston rod 12 so as to separate the tongue member 5 from the bell 1.

The piston 14 continues to move under the action of fluid-pressure until it passes a port 27 when pressure is supplied from the cylinder 13 to the auxiliary cylinder 15 at a point on the opposite side of the piston 18 from the spring 19. This pressure in the auxiliary cylinder serves to compress the spring 19 and moves the piston 18 sufficiently to uncover a small exhaust port 28. The motion of the piston 18 also opens the valve 17 so that the valve 16 may be closed by the action of the spring 21 to cut off the fluid-pressure supply and the pressure existing under the piston 14 in the cylinder 13 is immediately relieved through the valve 17 and the port 28.

As soon as the pressure is relieved from the cylinder 13 the spring 26 returns the piston 14 and the bell crank 6 to their initial positions. The angle of the bell crank 6 and the length of the piston rod 12 are such that when the piston 14 is in engagement with the stop 25, the tongue member 5 is removed a short distance from the inner surface of the bell 1 but when the bell crank is suddenly returned to this position the inertia of the tongue member 5 is sufficient to temporarily overcome the pressure of the spring 11 and to strike the inner surface of the bell. As soon as its inertia is spent, however, it is immediately returned to its starting position by the spring and thus interfering vibrations of the tongue and the bell are prevented. When the air pressure is exhausted sufficiently from under the piston 18 which operates in the auxiliary cylinder 15, the valve 17 is closed by the spring 19 and the valve 16 is again opened. Upon the reopening of the valve 16, pressure is again admitted in a similar manner and the piston rod 12 moves through another stroke.

Although I have shown a specific arrangement of parts I desire that my invention may not be restricted thereto but that variations in the size and arrangement of the details which effect similar results shall be included in its scope.

I claim as my invention:

1. A bell striker operating mechanism comprising a main cylinder, a piston and a fluid-pressure-opposing spring in said cylinder, an auxiliary cylinder into which the main cylinder exhausts, an exhaust valve for the auxiliary cylinder, and an inlet valve for the main cylinder that is held open by said exhaust valve when the latter is closed.

2. The combination with a bell, a striker and an operating member for said striker, of a main cylinder, a piston located in said cylinder and connected to said operating member, a spring in said cylinder for moving said piston in one direction, an auxiliary cylinder into which air is exhausted from the main cylinder, an inlet valve for the main cylinder and an exhaust valve for the auxiliary cylinder, each of said valves being opened when the other is closed.

3. The combination with a bell and a striker therefor, of a fluid-pressure-actuated piston connected to said striker, a main cylinder for said piston, an auxiliary cylinder into which the main cylinder exhausts, an exhaust valve for the auxiliary cylinder, an inlet valve for the main cylinder that is held open by the said exhaust valve when the latter is closed, and springs tending to close said valves.

4. The combination with a bell and a striker therefor, of a fluid-pressure-actuated piston connected to said striker, a main cylinder for said piston, a spring in said cylinder acting in opposition to the fluid-pressure, an auxiliary cylinder into which the main cylinder exhausts, an exhaust valve for the auxiliary cylinder, an inlet valve for the main cylinder that is held open by the said exhaust valve when the latter is closed, and springs tending to close said valves.

5. The combination with a bell, a striker therefor, an operating member for moving said striker into and out of engagement with the surface of the bell, a primary fluid-pressure cylinder, a piston adapted to operate therein, an auxiliary cylinder, an admission valve for said primary cylinder, a second valve which normally prevents admission of fluid-pressure to the auxiliary cylinder and which is interlocked with said admission valve, and a connecting port between the primary and the auxiliary cylinders whereby fluid-pressure may be admitted to the auxiliary cylinder when the piston which operates within the primary cylinder has reached a predetermined point in its travel, of means for automatically opening and closing the admission valve to effect an oscillatory motion of the piston which operates in the primary cylinder.

In testimony whereof, I have hereunto subscribed my name this 30th day of March, 1906.

CHRISTIAN AALBORG.

Witnesses:
 FRANK CONRAD,
 BIRNEY HINES.